March 12, 1968  C. W. MAY ETAL  3,372,892
RETRACTABLE WHEEL MOUNTINGS
Filed Jan. 19, 1966  7 Sheets-Sheet 3

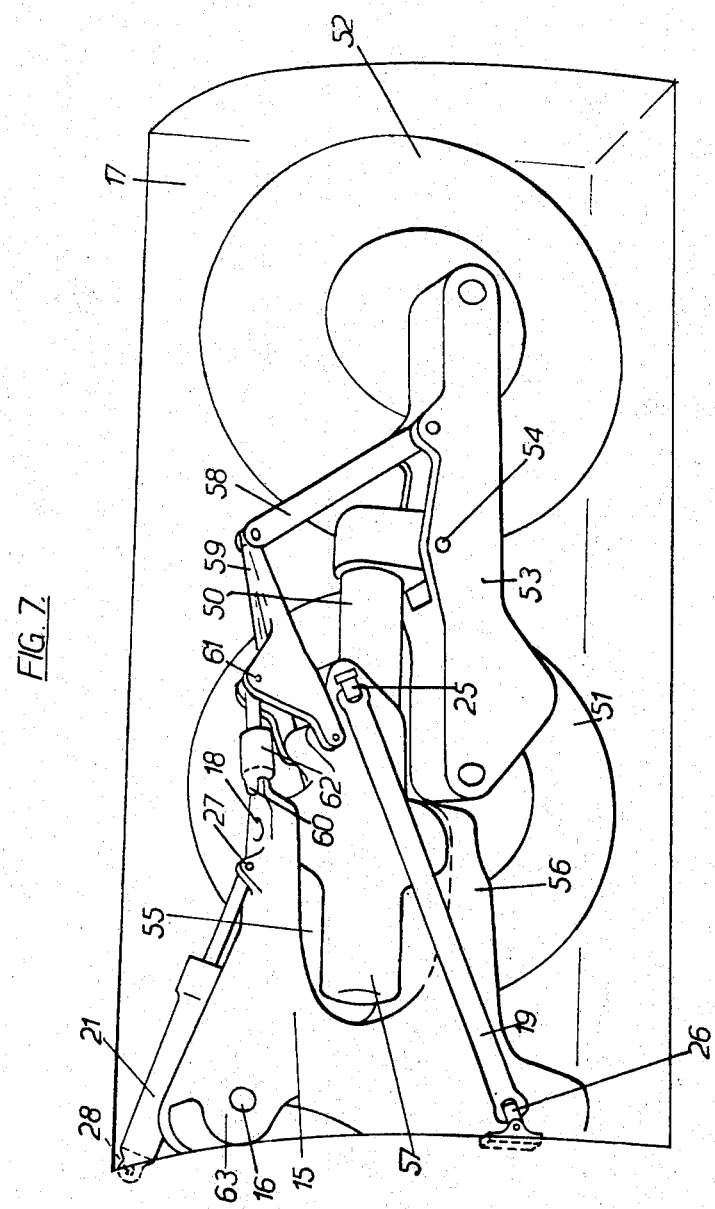

United States Patent Office 3,372,892
Patented Mar. 12, 1968

3,372,892
RETRACTABLE WHEEL MOUNTINGS
Charles William May, St. Albans, and Edward Charles Poncia, Hatfield, England, assignors to Hawker Siddeley Dynamics Limited, Hatfield, England, a British company
Filed Jan. 19, 1966, Ser. No. 521,678
Claims priority, application Great Britain, Jan. 17, 1966, 2,215/65
14 Claims. (Cl. 244—102)

ABSTRACT OF THE DISCLOSURE

The retractable ground wheel mounting has an outrigger member projecting laterally from the aircraft fuselage which is swingable inwardly around a vertical axis near its inner end, with a leg extending downwardly from its outer end connected thereto by a knee joint whose pivotal axis lies fore-and-aft when the mounting is extended; also a wheel assembly is carried at the lower end of the leg; and means are provided whereby when the outrigger member is swung inwardly into parallelism with the fore-and-aft line of the vehicle the leg will turn outwardly and upwardly about the knee joint until the joint is nearly straightened, a fixed-length rigid strut being coupled at one end by a universal joint to the leg and at the other end by a second universal joint to the fuselage to accomplish the turning of the leg about the knee joint and to act as a lateral bracing member when the mounting is extended.

Description of invention

This invention relates to wheel mountings for vehicles having retractable ground wheels.

The invention is primarily concerned with aircraft undercarriages, although it can also be applied to other wheeled vehicles, such as baby carriages, invalid carriages and so forth, where it is desirable that the wheels should be stowable for ease of transport, packing etc. However, it will be convenient to describe the invention in its aircraft application.

While for reasons of strength and rigidity it is desirable, especially in heavy freight-carrying aircraft, for the undercarriages to be mounted on the aircraft fuselage rather than the wings, this places a limit on the wheel span that can be attained if a conventional approach is adopted. And it will be understood that a large wheel span is advantageous from the point of view of stability. Accordingly, it is a principal object of this invention to achieve greater wheel span with fuselage-mounted undercarriages.

The present invention provides a retractable ground wheel mounting comprising an outrigger member to project laterally from the aircraft fuselage (or other vehicle body) and swingable inward about an upright pivot axis at or near its inner end, a leg extending downwardly from the outer end of the outrigger member and connected thereto by a knee joint the pivot axis of which lies generally fore-and-aft when the mounting is extended, a wheel assembly carried at the lower end of the leg, and means coupled to the leg whereby when the outrigger member is swung inward to a condition of parallelism or near parallelism with the fore-and-aft line of the vehicle the leg is caused to turn outward and upward about the knee joint until said joint is straightened or nearly straightened.

In the application to aircraft, a hydraulic retraction jack may be provided, coupled between the outrigger and the fuselage, to swing the outrigger inward to retract, and outward to extend, the mounting. Preferably, the turning of the leg about the knee joint is accomplished by means of a fixed-length link coupled by universal joints to the leg on the one hand and to the fuselage on the other, and acting as a lateral bracing member when the mounting is extended.

Figure 1:
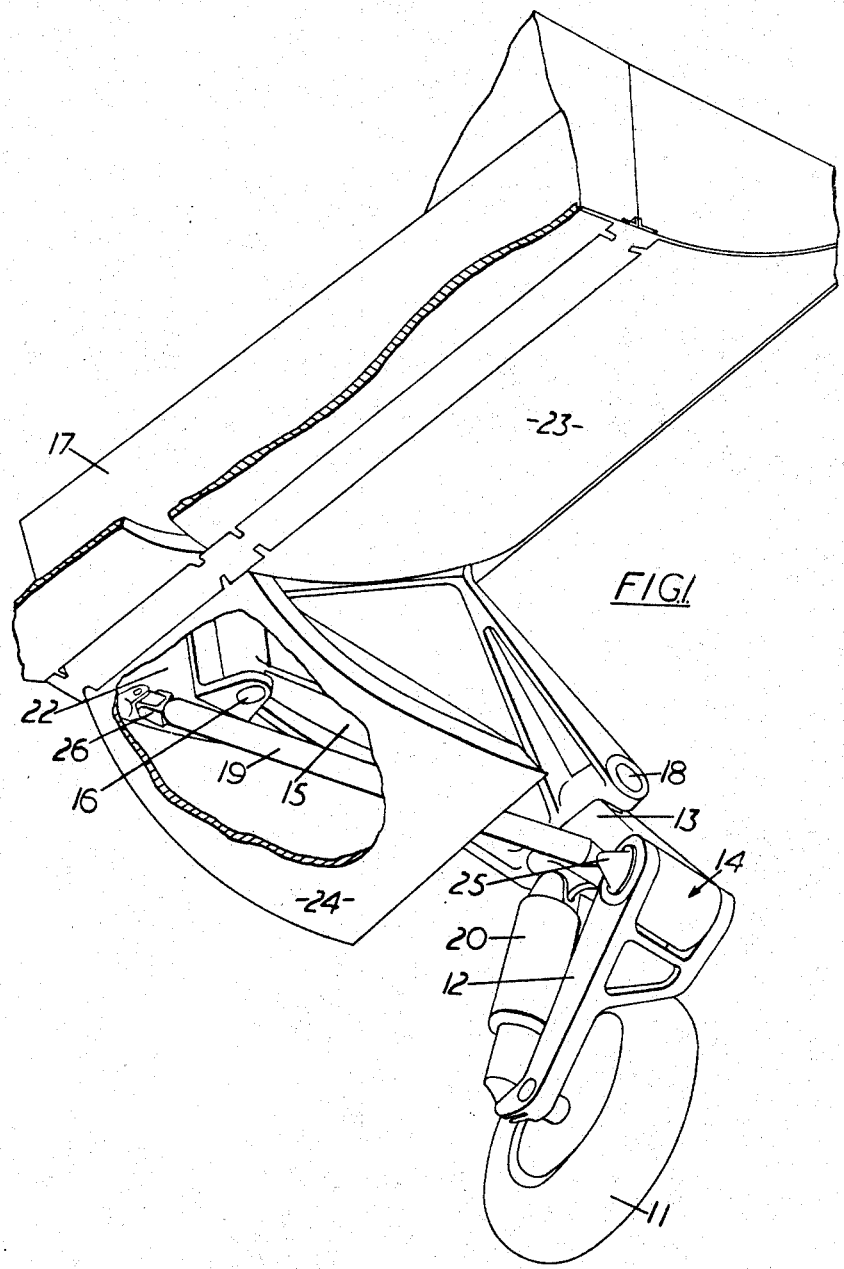
Figure 2:
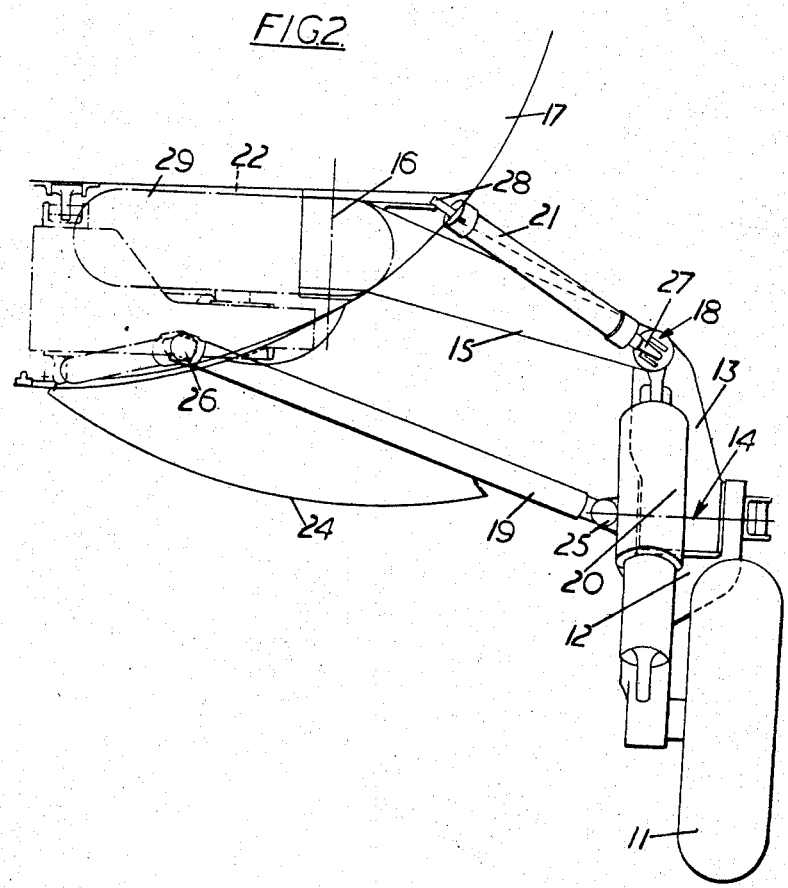
Figure 3:
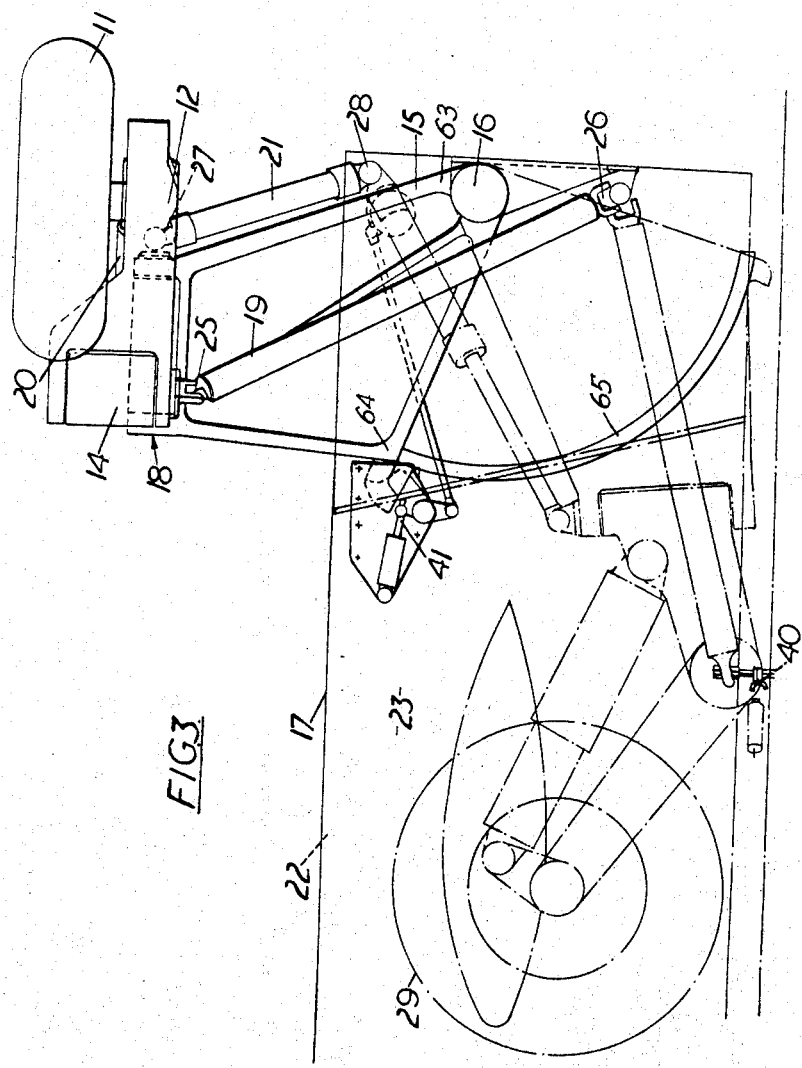
Figure 4:
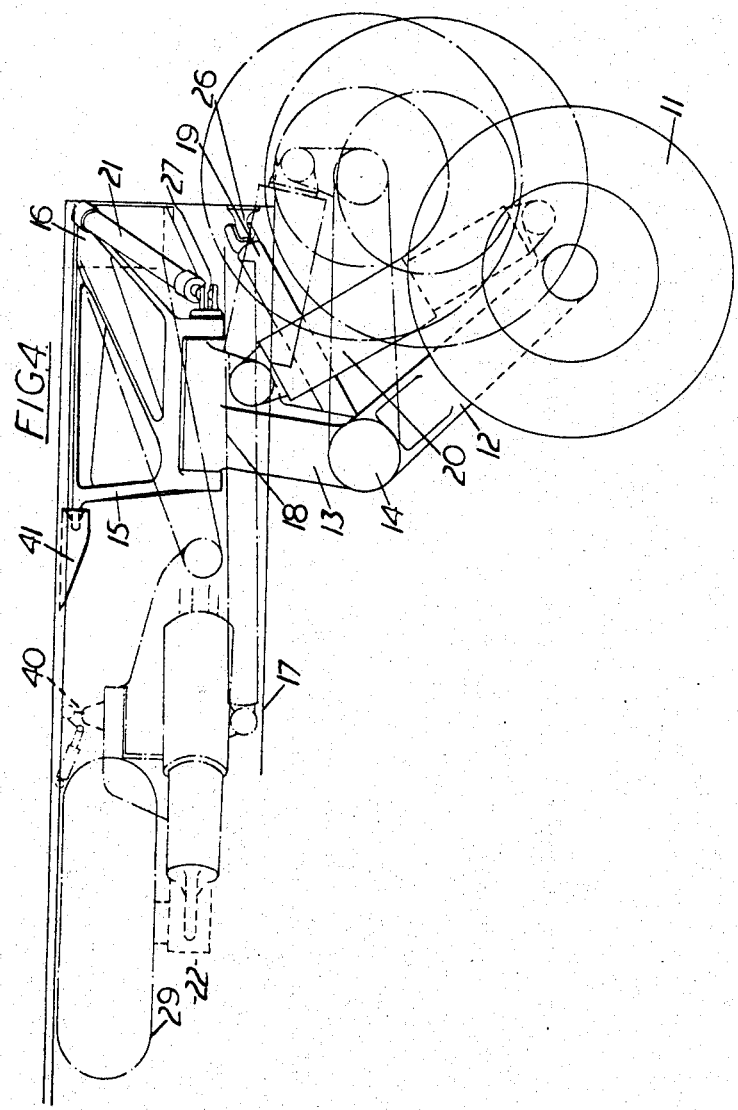
Figure 5:
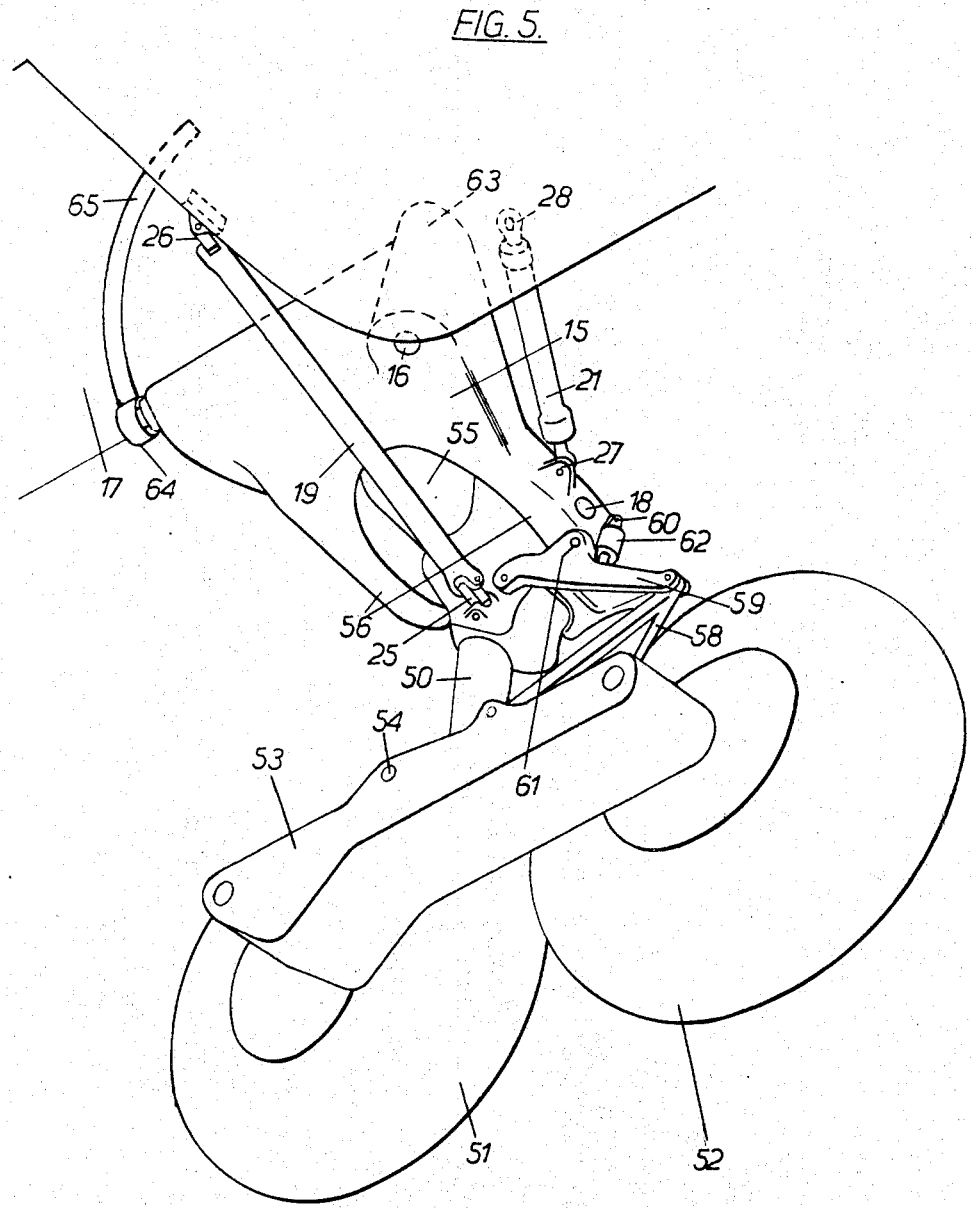
Figure 6:
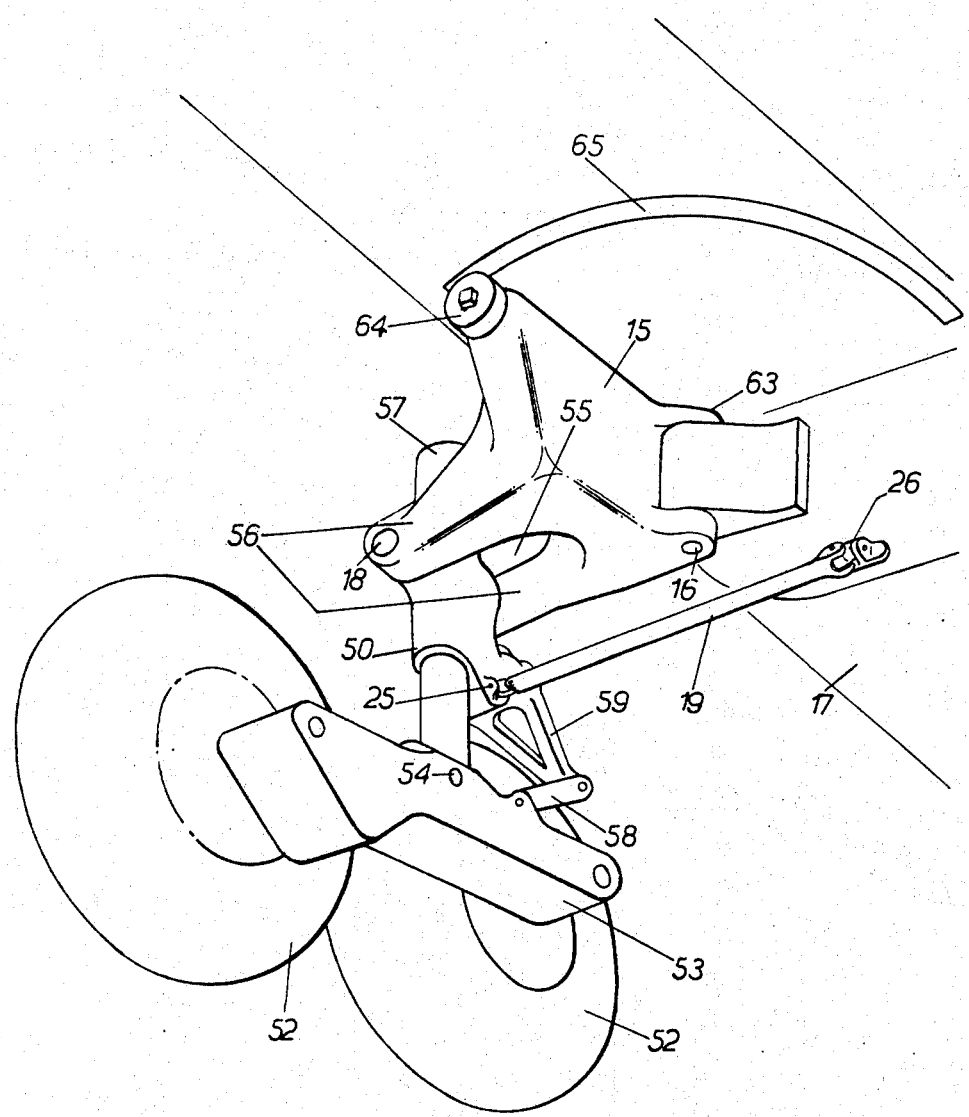

Two forms of aircraft undercarriage embodying the invention will now be described by way of example and with reference to the accompanying drawings, in which:

FIGURE 1 is a pictorial underneath view of a first undercarriage with a single ground wheel, FIGURE 2 is an elevation looking in the fore-and-aft direction, FIGURE 3 is an underneath plan, FIGURE 4 is a side elevation, FIGURE 5 is a pictorial underneath view of a second form of undercarriage with tandem wheels, seen from a viewpoint inboard and to the rear, FIGURE 6 is a pictorial view of the undercarriage of FIGURE 5 seen from a viewpoint inboard and forward, and FIGURE 7 is a view from underneath showing the undercarriage retracted and stowed.

Referring firstly to FIGURES 1 to 4, the undercarriage therein is shown in the extended condition. A ground-wheel 11 is mounted at the lower end of a trailing arm 12, the upper end of which is pivotally connected at 14 to the lower end of a comparatively short leg member 13. A robust cantilever or outrigger arm 15 is able to swing about a substantially vertical pivot 16 on the aircraft fuselage 17, and the upper end of the leg 13 is hinged on the outer end of the outrigger arm 15 at a knee joint 18 the pivot of which is substantially horizontal and lies in the fore-and-aft direction of the aircraft when the undercarriage is extended. A rigid bracing link 19 extends between a connection to the pivot 14 at the lower end of the leg member 13 and an anchorage on the fuselage, and thereby holds the leg 13 substantially at right angles to the outrigger arm 15. That is to say, when the undercarriage is extended the outrigger arm projects out laterally from the fuselage in a generally horizontal plane while the leg member 13 depends susbtantially vertically from the knee joint at the outer end of that arm.

A telescopic oleo strut 20 is coupled between lugs at the lower and upper ends of the trailing arm 12 and the leg member 13, respectively, so as to provide a shock-absorbing wheel suspension allowing the wheel 11 to rise and fall relatively to the leg 13 and outrigger arm 15. A hydraulic retraction jack 21 is coupled between the rear end of the pivot of the knee joint 18 and an anchorage on the fuselage.

The undercarriage retracts into a stowage bay 22 low down and to one side in the fuselage 17 which bay has a forward closure door 23 and a smaller after door 24. During retraction and extension of the undercarriage both doors are open but when the undercarriage is fully down only the after door 24 need be open.

To retract the undercarriage the retraction jack 21 extends and in doing so swings the outrigger arm 15 forward and inward. As this occurs the leg member 13 is caused by the link 19 to turn outward and upward about the knee joint 18, taking with it the trailing arm 12 and wheel 11. To enable the undercarriage members to move in this way the connections of the link 19 to the trailing arm pivot 14 and the fuselage 17 comprise universal joints 25, 26, respectively, and likewise the jack 21 is connected to the knee joint pivot and the fuselage by respective universal joints 27, 28. By the end of the retraction movement the outrigger arm 15 has turned through substantially 90° so that it now lies in the bay 22 generally parallel to the fore-and-aft line of the fuselage, while the leg 13 and wheel 11 have swung up also through substantially 90° thereby straightening the knee joint 18 and bringing the leg into the same general fore-and-aft line as the outrigger arm 15. The leg 13, trailing arm 12 and wheel 11 therefore lie in the bay 22 forward of the outrigger arm 15 with the wheel substantially in the horizontal plane, as indicated in broken lines at 29.

As already mentioned the outrigger arm 15, which is required to withstand substantial loadings, is of robust construction and it may take the form of a massive built-up cantilever bracket of considerable dimensions both vertically and in the fore-and-aft direction of the fuselage. Conveniently, the pivot 16 of this bracket is located at an inward and rearward extremity 63 thereof, and in addition to the anchorage to the fuselage that is afforded to the bracket by this pivot the bracket also has a forward extremity 64 (considering the undercarriage in the extended condition) which maintains engagement with a fuselage strength member 65 at a point some distance forward and somewhat outboard of the pivot 16. This relieves the pivot 16 of twisting moments.

The usual automatic locks 40, 41 are provided to lock the undercarriage in the stowed and down positions, and the down lock 41 may be arranged to cooperate with the outrigger arm or bracket at the aforesaid forward point of engagement with the fuselage.

In the particular arrangement described the pivotal connections of the link 19 and the retraction jack 21 to the fuselage 17 lie almost in the same vertical plane, transverse to the fuselage, as the outrigger pivot 16, the connection of the link 19 being inboard of and somewhat below the pivot 16 while the connection of the jack 21 is higher and outboard of the pivot 16. The link 19 is longer than the outrigger and substantially as long as the combined length that the outrigger and leg member 13 have when the knee joint is straight (stowed condition). However, it is not essential for the bracing link to be this long or indeed any longer at all than the outrigger. Changing the point of connection to the fuselage will enable the link to be shortened but then a smaller amount of turning of the leg member 13, for a given amount of swing of the outrigger, will be obtained. On the other hand, if the link pivot is mounted in a cam track on the fuselage and is arranged to shift automatically as retraction or extension of the undercarriage takes place, the link can be shortened without necessarily reducing the amount of turn of the leg member 13.

The technique according to the invention is also applicable to an undercarriage on which a number of ground wheels are provided, for example two wheels arranged as a tandem pair as illustrated in FIGS. 5 to 7. In these figures parts equivalent to those already described in connection with FIGURES 1 to 4 are given like reference numerals. The leg member 50 is now longer with the wheels 51, 52 carried on a bogie truck 53 pivotally mounted at 54 on the lower end of the leg 50. The leg 50 itself constitutes a vertical telescopic oleo strut and it is desirable that it should extend above the knee joint; the outrigger bracket 15 is of bifurcated configuration and this provides a space 55 between the fork arms 56 for the upper portion 57 of the leg 50 above the knee joint 18 when the joint straightens on retraction.

To use the available fuselage space economically it is desirable that when retracted the tandem pair of wheels 51, 52 shall lie in substantially the same horizontal plane in the stowage bay and one behind the other in the fore-and-aft direction. To achieve this it is necessary to turn the bogie truck 53 with respect to the leg 50 during retraction, through substantially 90° about the bogie truck pivot 54 into the position shown in FIGURE 7. An appropriate pivotal linkage is therefore provided between the outrigger bracket 15 and the bogie truck 53. Since there is ordinarily an articulated pair of torque links 58, 59 between the bogie truck and the upper part of the telescopic oleo leg 50, to prevent the bogie truck and the lower telescopic part of the leg from swivelling in the horizontal plane with respect to the upper part of the leg, it is merely necessary to connect a further hydraulic actuator link 62 between a fore-and-aft pivot 60 on the outrigger 15, just outboard of the knee joint 18 and with its pivotal axis substantially parallel to the knee joint axis, and a transverse pivot 61 at an intermediate point along the upper link 59 of the two torque links.

What we claim is:

1. A retractable groundwheel mounting comprising an outrigger member to project laterally from the aircraft fuselage (or other vehicle body) in a substantially horizontal direction and swingable inward about a substantially vertical pivot axis at or near its inner end, a leg extending downwardly from the outer end of the outrigger member and connected thereto by a knee joint the pivot axis of which lies generally fore-and-aft when the mounting is extended, a wheel assembly carried at the lower end of the leg, and means coupled to the leg whereby when the outrigger member is swung inward to a condition of parallelism or near parallelism with the fore-and-aft line of the vehicle the leg is caused to turn outward and upward about the knee joint until said joint is straightened or nearly straightened and wherein a fixed-length rigid link is coupled at one end by a first universal joint to the leg and at the other end by a second universal joint to the fuselage, to accomplish the turning of the leg about the knee joint and act as a lateral bracing member when the mounting is extended.

2. A mounting according to claim 1, wherein a hydraulic retraction jack is coupled between the outrigger and the fuselage, to swing the outrigger inward to retract, and outward to extend, the mounting.

3. A mounting according to claim 2, wherein the pivotal connections of the fixed length link and the retraction jack to the fuselage lie substantially in the same vertical plane, transverse to the fuselage, as the outrigger pivot on the fuselage, the connection of the link being inboard of and somewhat below the outrigger pivot while the connection of the jack is higher and outboard of the outrigger pivot.

4. A mounting according to claim 3, wherein the fixed length link is substantially as long as the combined length of the outrigger and leg when the knee joint is straightened.

5. A mounting according to claim 1, wherein tandem wheels are carried on a bogie truck pivotally mounted on the lower end of the leg, and the leg itself constitutes a telescopic oleo strut.

6. A mounting according to claim 5, wherein the oleo strut extends above the knee joint and the outrigger member is bifurcated to provide room between the fork arms thereof for the upper portion of the oleo strut when the knee joint straightens on retraction.

7. A mounting according to claim 6, wherein a pivotal linkage is provided between the bogie truck and the outrigger member whereby the truck is automatically turned through substantially a right angle with respect to the leg on retraction so that when stowed the wheels lie substantially in the same horizontal plane and one behind the other in the fore-and-aft direction.

8. A mounting according to claim 7, wherein said pivotal linkage comprises an articulated pair of torque links between the bogie truck and the upper part of the telescopic oleo leg, and a further link extending between a pivot on the outrigger just outboard of the knee joint, said pivot having its axis substantially parallel to the fore-and-aft knee joint axis, and a transverse pivot at an intermediate point along the upper of the two torque links.

9. A mounting according to claim 1, wherein a ground wheel is carried on a trailing arm pivotally connected at its forward end to the lower end of the leg, and the aforesaid link is coupled to the leg at the location of that pivotal connection.

10. A mounting according to claim 9, and comprising a telescopic oleo strut coupled between the trailing end of the arm and the upper end of the leg.

11. A mounting according to claim 1, arranged to retract into a bay in the fuselage that has two doors disposed one behind the other in the fore-and-aft direction, one door being larger than the other, and only the smaller door being open when the mounting is fully extended while the larger door is opened to allow retraction and extension.

12. A mounting according to claim 1, wherein the outrigger member is in the form of a cantilever bracket having considerable dimensions both vertically and fore-and-aft, its pivotal connection to the fuselage is located at an inboard rearward extremity thereof, and it has a forward extremity which maintains engagement with a fuselage strength member at a point some distance forward and outboard of said pivotal connection when the mounting is extended.

13. A retractable ground wheel mounting comprising an outrigger member to project laterally from the aircraft fuselage (or other vehicle body) and swingable inwardly about an upright pivot axis at or near its inner end, a leg extending downwardly from the outer end of the outrigger member and connected thereto by a knee joint the pivot axis of which lies generally fore-and-aft when the mounting is extended, a wheel assembly carried at the lower end of the leg, and means coupled to the leg whereby when the outrigger member is swung inwardly to a condition of parallelism or near parallelism with the fore-and-aft line of the vehicle the leg is caused to turn outwardly and upwardly about the knee joint until said joint is straightened or nearly straightened, and wherein a ground wheel is carried on a trailing arm pivotally connected at its forward end to the lower end of the leg, and a telescopic oleo strut is coupled between the trailing end of the arm and the upper end of the leg.

14. A retractable groundwheel mounting comprising an outrigger member to project laterally from the aircraft fuselage (or other vehicle body) and swingable inwardly about an upright pivot axis at or near its inner end, a leg extending downwardly from the outer end of the outrigger member and connected thereto by a knee joint the pivot axis of which lies generally fore-and-aft when the mounting is extended, a wheel assembly carried at the lower end of the leg, and means coupled to the leg whereby when the outrigger member is swung inwardly to a condition of parallelism or near parallelism with the fore-and-aft line of the vehicle the leg is caused to turn outwardly and upwardly about the knee joint until said joint is straightened or nearly straightened, and wherein the outrigger member is in the form of a cantilever bracket having considerable dimensions both vertically and fore-and-aft, its pivotal connection to the fuselage is located at an inboard rearward extremity thereof, and it has a forward extremity which maintains engagement with a fuselage strength member at a point some distance forward and outboard of said pivotal connection when the mounting is extended.

References Cited

UNITED STATES PATENTS 2,963,246  12/1960  Mitrovich _____ 244—102

FOREIGN PATENTS 781,892  8/1957  Great Britain.
806,024  12/1958  Great Britain.
860,432  2/1961  Great Britain.

MILTON BUCHLER, *Primary Examiner.*

P. E. SAUBERER, *Assistant Examiner.*